United States Patent
Gaube et al.

(10) Patent No.: US 12,444,918 B2
(45) Date of Patent: Oct. 14, 2025

(54) PROTECTION DEVICE AND METHOD FOR MONITORING AN ELECTRICAL ENERGY SUPPLY GRID

(71) Applicant: Siemens Aktiengesellschaft, Munich (DE)

(72) Inventors: Sven Gaube, Neustadt an der Aisch (DE); Johann Jaeger, Erlangen (DE); Robert Kirkman, Altdorf (DE); Elmar Nöth, Erlangen (DE); Michael Jaworski, Höchstädt (DE); Philipp Klumpp, Nuremberg (DE); Martin Strauss, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 220 days.

(21) Appl. No.: 18/256,688

(22) PCT Filed: Nov. 29, 2021

(86) PCT No.: PCT/EP2021/083309
§ 371 (c)(1),
(2) Date: Jun. 9, 2023

(87) PCT Pub. No.: WO2022/122441
PCT Pub. Date: Jun. 16, 2022

(65) Prior Publication Data
US 2024/0039269 A1    Feb. 1, 2024

(30) Foreign Application Priority Data

Dec. 9, 2020   (EP) ..................... 20212660

(51) Int. Cl.
*H02H 1/00*   (2006.01)
*G01R 31/08*  (2020.01)
(Continued)

(52) U.S. Cl.
CPC ......... *H02H 1/0092* (2013.01); *G01R 31/086* (2013.01); *G06N 3/092* (2023.01); *H02J 13/00002* (2020.01); *H02J 13/0004* (2020.01)

(58) Field of Classification Search
CPC ...... H02H 1/0092; H02H 7/28; G01R 31/086; G01R 31/08; G06N 3/092; G06N 3/006;
(Continued)

(56) References Cited

U.S. PATENT DOCUMENTS

| | | | | |
|---|---|---|---|---|
| 5,159,660 A | * | 10/1992 | Lu | G05B 13/027 700/48 |
| 5,724,247 A | * | 3/1998 | Dalstein | H02H 1/0092 702/158 |

(Continued)

FOREIGN PATENT DOCUMENTS

| | | |
|---|---|---|
| DE | 19613012 C1 | 8/1997 |
| EP | 1729243 A1 * 12/2006 | ......... G06F 18/2135 |

(Continued)

OTHER PUBLICATIONS

Mahanty RN et al: "Application of RBF neural network to fault classification and location in transmission lines", IEE Proceedings: Generation, Transmission and Distribut, Institution of Electrical. Engineers, GB, vol. 151, No. 2, , pp. 201-212, XP006021648, ISSN: 1350-2360, DOI: 10.1049/IP-GTD:20040098, p. 2, col. 1, line 6—p. 4, col. 2, line 26; figures 1,3-5; 2004.

*Primary Examiner* — Dharti H Patel
(74) *Attorney, Agent, or Firm* — Laurence A. Greenberg; Werner H. Stemer; Ralph E. Locher

(57) ABSTRACT

A protection device for monitoring an energy supply grid has a measured value acquisition device for acquiring measured values which indicate an electrical state of the energy supply grid, and an evaluation device which is connected to the measured value acquisition device and is configured to carry out a plurality of protection functions and, as a result, to (Continued)

make a decision as to whether the energy supply grid is in a permissible or impermissible operating state. Here, the evaluation device be designed entirely in the form of a single neural network with an input neuron layer that receives the measured values and/or values derived therefrom, intermediate neuron layers, and an output neuron layer which outputs a classification of operating states of the energy supply grid. The neural network for classifying the operating states is trained to carry out all protection functions together.

11 Claims, 8 Drawing Sheets

(51) Int. Cl.
    *G06N 3/092*     (2023.01)
    *H02J 13/00*     (2006.01)

(58) Field of Classification Search
    CPC . G06N 3/084; H02J 13/00002; H02J 13/0004
    USPC .......................................................... 361/42
    See application file for complete search history.

(56) References Cited

U.S. PATENT DOCUMENTS

| | | | | |
|---|---|---|---|---|
| 5,726,847 A | * | 3/1998 | Dalstein | H02J 13/00002 361/87 |
| 5,784,233 A | * | 7/1998 | Bastard | H02H 7/045 361/93.6 |
| 5,854,590 A | * | 12/1998 | Dalstein | G01R 31/52 706/915 |
| 6,405,184 B1 | * | 6/2002 | Bohme | H02H 1/0092 706/42 |
| 9,721,190 B2 | * | 8/2017 | Vijayanarasimhan | G06N 3/082 |
| 2018/0174022 A1 | * | 6/2018 | Young | G06N 3/063 |

FOREIGN PATENT DOCUMENTS

| | | | | |
|---|---|---|---|---|
| EP | 3460494 A1 | | 3/2019 | |
| WO | WO-9509464 A1 | * | 4/1995 | .......... H02J 13/0004 |
| WO | WO-2024038114 A1 | * | 2/2024 | ............. G06N 3/045 |

\* cited by examiner

PROTECTION DEVICE AND METHOD FOR MONITORING AN ELECTRICAL ENERGY SUPPLY GRID

FIELD AND BACKGROUND OF THE INVENTION

The invention relates to a protection device for monitoring an electrical energy supply grid, having a measured value acquisition device for acquiring measured values which have been recorded at at least one measuring point in the energy supply grid and indicate an electrical state of the energy supply grid at the measuring point, and an evaluation device which is connected to the measured value acquisition device and is configured to carry out a plurality of protection functions on the basis of the measured values and, as a result of the protection functions being carried out, to make a decision as to whether the energy supply grid is in a permissible or an impermissible operating state.

The invention also relates to a method for monitoring an electrical energy supply grid, in which measured values are acquired at at least one measuring point in the energy supply grid and indicate an electrical state of the energy supply grid at the measuring point, the measured values are transmitted to a protection device, and a plurality of protection functions are carried out on the basis of the measured values by means of an evaluation device of the protection device and, as a result of the protection functions being carried out, a decision is made as to whether the energy supply grid is in a permissible or an impermissible operating state.

So-called protection devices are used to monitor primary components of electrical energy supply grids, e.g. lines, transformers, motors, generators, in order to detect and automatically switch off impermissible operating states of the primary component being monitored in each case, which can be caused by short circuits or ground faults, for example. For this purpose, the protection device usually records measured values, for example current and/or voltage measured values, which characterize the operating state of the primary component, at one or more measuring points in the energy supply grid. In order to carry out its protection function, the protection device then evaluates the measured values by executing a so-called protection algorithm, i.e. a calculation and/or logical combination rule for evaluating the recorded measured values, and depending on the result of the evaluation it generates a trip signal, if necessary, which causes a circuit breaker connected to the protection device to open its switching contacts in order to separate the faulty line from the rest of the energy supply grid.

In connection with the detection of faults in energy supply grids, in addition to the question of whether a fault has occurred at all, it is also important, for example, to ask about a type of fault and a fault location. A type of fault characterizes the present fault more specifically and indicates, for example, in which possible fault loop of the multiphase energy supply grid and/or in which direction the fault is present, as seen from the measuring point. In a three-phase energy supply grid with three conductors (conductor 1, conductor 2, conductor 3), there are seven possible fault loops depending on the conductors involved in the fault. A fault location specifies the faulty component and, if applicable, a specific fault location (e.g. distance to the fault on a line). In addition, various operating states (events) of the energy supply grid can occur which must not be recognized as faults and should therefore not lead to a switch being tripped. Such events can be, for example, an inrush situation or an existing grid oscillation.

The decision as to whether an operating state is permissible or impermissible, as well as a more precise classification of an impermissible operating state (e.g. through event classification, fault type detection and fault location determination), is achieved by a protection device by carrying out a plurality of protection functions that are specialized in different analyses. For example, there are protection functions for detecting a fault type and for determining a fault location.

In network protection technology, protection functions can also be divided into autonomous and coordinative functions. Autonomous decisions can be made by a protection device without considering other protection devices in the vicinity. Examples of this are inrush detection or fault loop selection. On the other hand, coordinative protection functions require the involvement of the surrounding protection devices and usually reflect tripping decisions where the principle of selectivity must be preserved.

Due to recent developments in the field of energy supply grids, for example the liberalization of the power generation markets and associated breaking up of traditional power transmission directions in the energy supply grid through decentralized power feed-in, ever greater demands are being made on protection devices in energy supply grids in terms of their reliability and selectivity, so that a flexible and adaptive possible way of adapting the protection functions used in each case is required to detect impermissible operating states. The functionality permanently implemented in the protection device by means of the protection algorithms cannot be changed later, or can only be changed within narrow limits. The protection device can only be adapted to new conditions in the energy supply grid by installing new device software (firmware) and a correspondingly changed configuration and, if necessary, by changing the device hardware.

It is known practice to replace individual protection functions of an autonomous type with separately trained neural networks in the context of a plug and play approach and to embed them in the existing protection algorithm or the existing protection logic. Such approaches are known, for example, from DE 4433406 C1, WO95/09463 A1, DE 4333258 A1 and WO95/09465 A1. In the known approaches, individual protection functions are replaced in each case with a specially trained neural network, therefore resulting in a mixture of protection functions that are carried out using classic algorithms and those that are carried out using a neural network.

SUMMARY OF THE INVENTION

Proceeding from a protection device and a method of the type mentioned at the outset, the present invention is based on the object of being able to make an even faster decision, that can be quickly adapted to different conditions in the energy supply grid, as to whether there is a permissible or impermissible operating state.

This object is achieved by means of a protection device of the type mentioned at the outset, wherein the evaluation device is designed entirely in the form of a single neural network and has an input neuron layer, to which the measured values and/or values derived therefrom are fed, at least one intermediate neuron layer and an output neuron layer that outputs a classification of operating states of the energy supply grid, wherein the neural network for classifying the operating states is trained to carry out all protection functions together.

An advantage of the protection device according to the invention is that a decision as to whether an operating state of the energy supply grid is a permissible or impermissible operating state can be made comparatively quickly, since the neural network carries out all protection functions together. In contrast to the previous approach in which only individual protection functions were implemented in a neural network, the protection device according to the invention no longer requires any deterministic algorithm which is implemented in the form of logic circuits and/or software. In addition, the neural network does not require any additional configuration settings and can also independently adapt to changed conditions, e.g. due to increased grid expansion and decentralized feeds.

An advantageous embodiment of the protection device according to the invention provides for at least one of the intermediate neuron layers to be connected to an intermediate output neuron layer, wherein each intermediate output neuron layer outputs a result specific to a single protection function.

In this way, quasi intermediate results of the classification of the operating state can be tapped off. This increases the transparency and thus the trustworthiness of the final decision on the operating state, since the individual decisions on which the classification of the operating state is based are apparent.

A further advantageous embodiment of the protection device according to the invention is that the protection functions include at least classification of an event, detection of a fault type and determination of a fault location.

In this way, the neural network is used to make the essential decisions that relate to a classification of an operating state and, if necessary, enable a fault to be classified precisely. In this context, for example, a short circuit, a ground fault, an inrush process, load switching and an osciliation are regarded as events. Not all events require a part of the energy supply grid to be switched off; e.g. in the event of inrush processes and damped oscillations, the operation of the energy supply grid should be maintained and a switch-off should be blocked.

A statement about the faulty loop is regarded as an indication of the fault type. The following loops can be affected by a fault in a three-phase system:
  Single-pole fault conductor 1—ground: L1E;
  Single-pole fault conductor 2—ground: L2E
  Single-pole fault conductor 3—ground: L3E
  Two-pole fault conductor 1—conductor 2: L12;
  Two-pole fault conductor 2—conductor 3: L23;
  Two-pole fault conductor 3—conductor 1: L31;
  Three-pole fault: L123.

In addition, in the case of multi-pole faults, a distinction can be made as to whether they occur with or without ground contact.

An indication of the fault location can, for example, include the indication of the faulty primary component, e.g. a line affected by a short circuit.

In addition to the protection functions mentioned, it is possible to add further protection functions which specify the decision about the operating state of the energy supply grid. For example, the fault location can be specified by specifying a section on the faulty line which, for example, indicates that section on which the fault occurred as a percentage of the line length (e.g. up to 20% of the line length). In addition, it is also possible to add so-called trip options which contain information about the functionality of any circuit breakers involved in a switch-off (e.g. "all switches intact", "circuit breaker primary protection failed", "circuit breaker secondary protection failed"). This information can be used to train the neural network to control redundant protection concepts with secondary protection or tertiary protection.

Due to the adaptive design with an evaluation device in the form of a neural network, the protection device according to the invention is designed to be highly scalable. This means that it can be used in a decentralized protection architecture as well as in a centralized protection architecture and in any intermediate level. The type of protection architecture influences the training of the neural network and must be taken into account accordingly.

Accordingly, according to an advantageous embodiment of the protection device according to the invention, provision is made for the protection device to be configured for local operation at an installation location in the vicinity of the measuring point and to have a command device for outputting control commands to switching devices of the energy supply grid, and for the neural network to be trained to classify operating states of the energy supply grid in a two-stage learning method.

This makes it possible to design a completely decentralized protection architecture and a partially decentralized protection architecture. A completely decentralized protection architecture includes individual protection devices which are usually arranged close to a measuring point and must interact with other protection devices when monitoring the energy supply grid. With a partially decentralized protection architecture, further measuring points are added and are also evaluated by the protection device. The addition can, for example, combine a plurality of outgoing circuits of a station or can take place at station or regional level.

Specifically, in this context, provision may be made for the protection device to be specifically trained for use at its installation location.

This allows the different behavior of measurement variables, such as current and voltage, to be taken into account at different points in the energy supply grid.

In this context, a further advantageous embodiment of the protection device according to the invention provides for the protection device to have a communication interface for connection to a higher-level control center and for receiving parameters for calibrating the neural network.

Although the protection device in decentralized operation does not need to communicate with other protection devices due to the flexible adaptation of the neural network to different operating scenarios, such a communication interface represents a suitable possibility for the control center to provide the protection device with changed configurations of the neural network as required. For example, such changed configurations can contain edge weights of the neural network, with which the behavior of the neural network can be adapted to the new situation after a topology change in the energy supply grid (e.g. due to switching processes and/or grid expansion).

With regard to the training of the neural network in decentralized use, provision may finally be made for the neural network to be trained in the first stage using a deep learning method and to be trained in the second stage using a reinforcement learning method.

In the deep learning method, which is preferably carried out with backpropagation, the neural network is presented with a large number of known progressions of measurement variables with corresponding classification labels. The neural network adapts its behavior to the presented scenarios up to a certain neuron layer. Using reinforcement learning, the neural network can learn an appropriate behavior when interacting with other protection devices. This is necessary, for example, for redundancy concepts with main and backup protection, for selective tripping schedules when switching and for the behavior when a circuit breaker fails.

As an alternative to the decentralized protection architecture, a centralized protection architecture can also be enabled. The protection device is then designed in the form of a data processing device in a control center or a cloud computing system and is connected to sensors and actuators in the energy supply grid via suitable communication connections.

In this context, an advantageous embodiment of the protection device according to the invention provides for the protection device to be a centralized protection device that is configured to receive measured values from sensors at a plurality of measuring points in the energy supply grid and to control switching devices at a plurality of points in the energy supply grid, and for the neural network to be trained to classify operating states of the energy supply grid using a one-stage learning method.

Specifically, provision can be made in this context for the neural network to be trained using a deep learning method.

Since there is no coordination between individual (decentralized) protection devices with a completely centralized protection architecture in comparison with the decentralized approach, a one-stage learning method based on training with deep learning (preferably with backpropagation) is sufficient.

The object mentioned above is also achieved by means of a method for monitoring an electrical energy supply grid of the type mentioned at the outset.

According to the invention, provision is made for the protection functions to be carried out with an evaluation device which is designed entirely in the form of a single neural network and has an input neuron layer, to which the measured values and/or values derived therefrom are fed, at least one intermediate neuron layer and an output neuron layer which outputs a classification of operating states of the energy supply grid.

All of the statements made above and below regarding the protection device according to the invention accordingly hold true with respect to the measuring system according to the method according to the invention and vice-versa; in particular, the protection device according to the invention is configured to carry out the method according to the invention in any desired embodiment or a combination of any desired embodiments. Also with regard to the advantages of the method according to the invention, reference is made to the advantages described for the protection device according to the invention.

An advantageous embodiment of the method according to the invention provides, before starting the monitoring of the energy supply grid, for the neural network for classifying the operating states to be trained to carry out all protection functions together.

In this way, the current operating state of the energy supply grid can be classified very quickly and in a manner that can be flexibly adapted to changing conditions.

A further advantageous embodiment of the method according to the invention provides for at least one of the intermediate neuron layers to be connected to an intermediate output neuron layer which outputs a result specific to a single protection function.

According to a further advantageous embodiment of the method according to the invention, provision may be made, in the case of a protection device that is configured for local operation at an installation location in the vicinity of the measuring point, for the neural network to be trained to classify operating states of the energy supply grid in a two-stage learning method before starting the monitoring.

Specifically, in this context, provision may be made, with the first stage of the learning method, for the structure of the neural network from the input neuron layer to an intermediate neuron layer immediately upstream of the output neuron layer to be trained using a deep learning method, and, with the second stage of the learning method, for the structure of the neural network from the intermediate neuron layer immediately upstream of the output neuron layer to the output neuron layer to be trained using a reinforcement learning method.

As an alternative to the decentralized approach, according to an advantageous embodiment of the method according to the invention, provision may also be made, in the case of a protection device which is configured, as a centralized protection device, to receive measured values from sensors at a plurality of measuring points in the energy supply grid and to control switching devices at a plurality of points in the energy supply grid, for the neural network to be trained to classify operating states of the energy supply grid before recording the monitoring using a one-stage learning method before starting the monitoring.

The invention will be explained in more detail hereinbelow on the basis of an exemplary embodiment. The specific design of the exemplary embodiment should not be understood as restricting for the general design of the method according to the invention and the device according to the invention in any way; on the contrary, individual design features of the exemplary embodiment may be combined in any desired manner freely with one another and with the features described above.

DETAILED DESCRIPTION OF THE INVENTION

Figure 1:
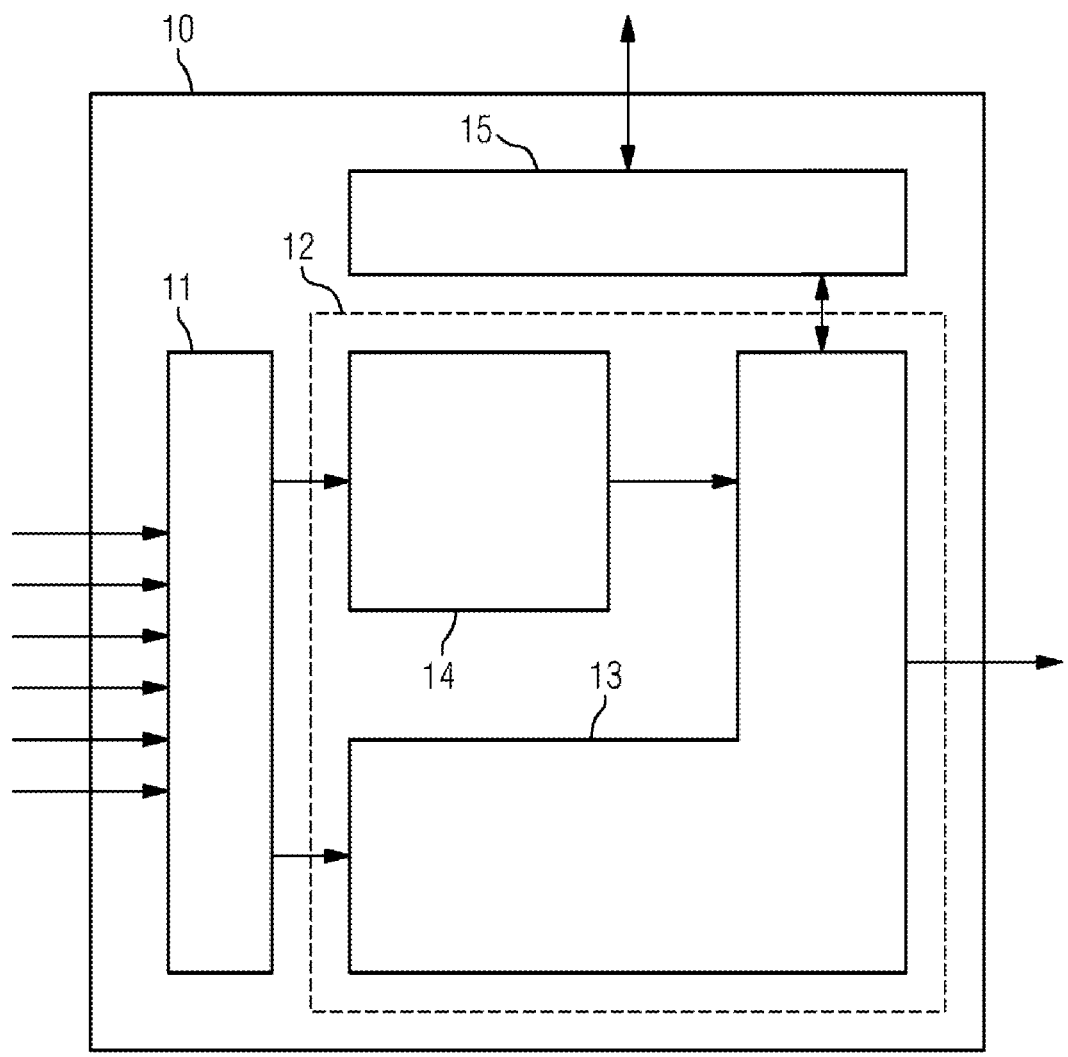
FIG. 1 shows a schematic representation of a protection device known from the prior art with a combination of a neural network and deterministic protection logic.

FIG. 1 shows a protection device 10 which is known from the prior art and is configured to monitor an electrical energy supply grid which is not shown in FIG. 1. The protection device 10 has a measured value acquisition device 11 and an evaluation device 12. In addition, a communication interface 15 for communicating with other protection devices and possibly a higher-level grid control center is provided.

The protection device 10 uses the measured value acquisition device to record measured values which were recorded at a measuring point in the energy supply grid and describe the progression of measurement variables that are suitable for characterizing the operating state of the energy supply grid at the measuring point. Such measurement variables can include, for example, a voltage, a current flow, a frequency, a power or a temperature. The measured values, if necessary after pre-processing (e.g. filtering, if necessary transformation), are fed to the evaluation device 12, with which a decision is made about the current operating state of the energy supply grid. If an impermissible operating state that can be traced back to a fault is detected, the evaluation device carries out further protection functions for detecting the fault type, the fault location, etc. and, if necessary, emits a trip signal on the output side, with which a switch provided in the energy supply grid is moved to open its switching contacts in order to interrupt a harmful fault current.

The evaluation device 12 includes, on the one hand, deterministic protection logic 13, with which the protection functions for classifying a fault are carried out. For this purpose, this protection logic 13 usually comprises a combination of a microprocessor and software (firmware) executed by the microprocessor. In addition, the evaluation device 12 has a neural network 14 which is designed to carry out an individual protection function, e.g. the detection of a fault type.

The protection device 10 can be, for example, a distance protection device, a differential protection device or an overcurrent protection device.

Figure 2:
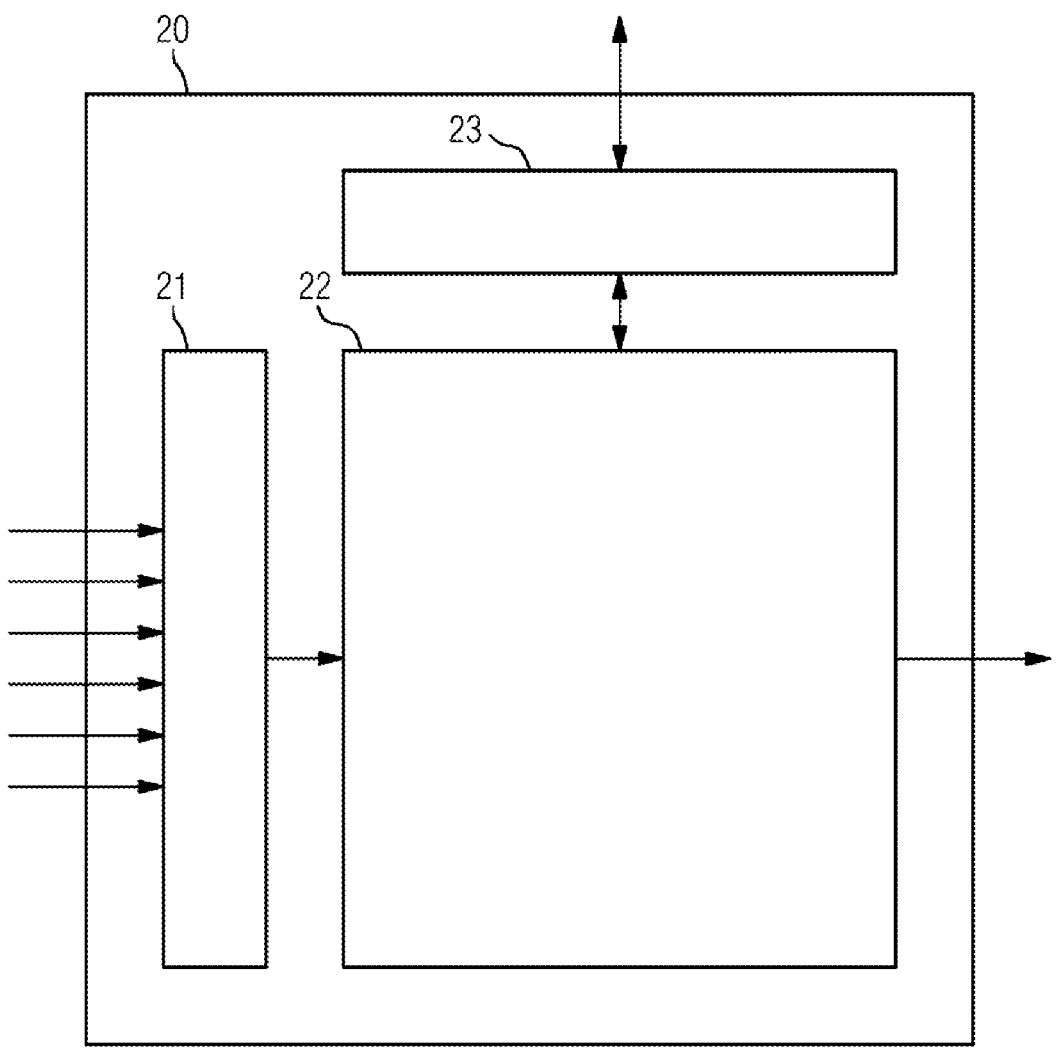
FIG. 2 shows a schematic representation of a protection device with a neural network.

FIG. 2 shows a protection device 20 which also has a measured value acquisition device 21 and an evaluation device 22. When used in a decentralized protection architecture, the protection device 20 also includes a communication interface 23 for connection to a higher-level control center. In contrast to the protection device 10 in FIG. 1, the evaluation device 22 comprises a single neural network that is configured to carry out all protection functions together.

The aim of the protection device 20 is thus to represent a single protection entity using a single neural network that is trained as a whole. This can be achieved by combining a training process and the structure of the neural network in a manner tailored to the requirements of protection technology for energy supply grids. Depending on the selected protection architecture (centralized/decentralized), the training process includes up to two training stages, each of which affects specific areas of the neural network.

A special feature of the solution approach that can be implemented with the protection device 20 lies in its scalability of decentralization or centralization. As a result, versions from decentralized protection entities to the centralized protection entity and all conceivable intermediate stages can be implemented according to the same principle; only the training is adapted to the respectively selected situation.

With a decentralized protection architecture, the first training stage reflects the learning of autonomous decisions and can be implemented on the basis of a deep learning approach with backpropagation. This training stage requires labeled training data that can be generated with reasonable effort. The second training stage is intended for the coordinative decisions. Due to the extremely wide variety of coordinative decisions, labeled training data cannot be generated with reasonable effort in this context. Therefore, this training stage is implemented with a reinforcement learning approach.

Since there are no coordinative decisions with a centralized protection concept, the neural network can be trained solely with the first training stage in this case.

The method of operation of the protection device 20 is to be explained in more detail below with reference to FIGS. 3 to 8.

Figure 3:
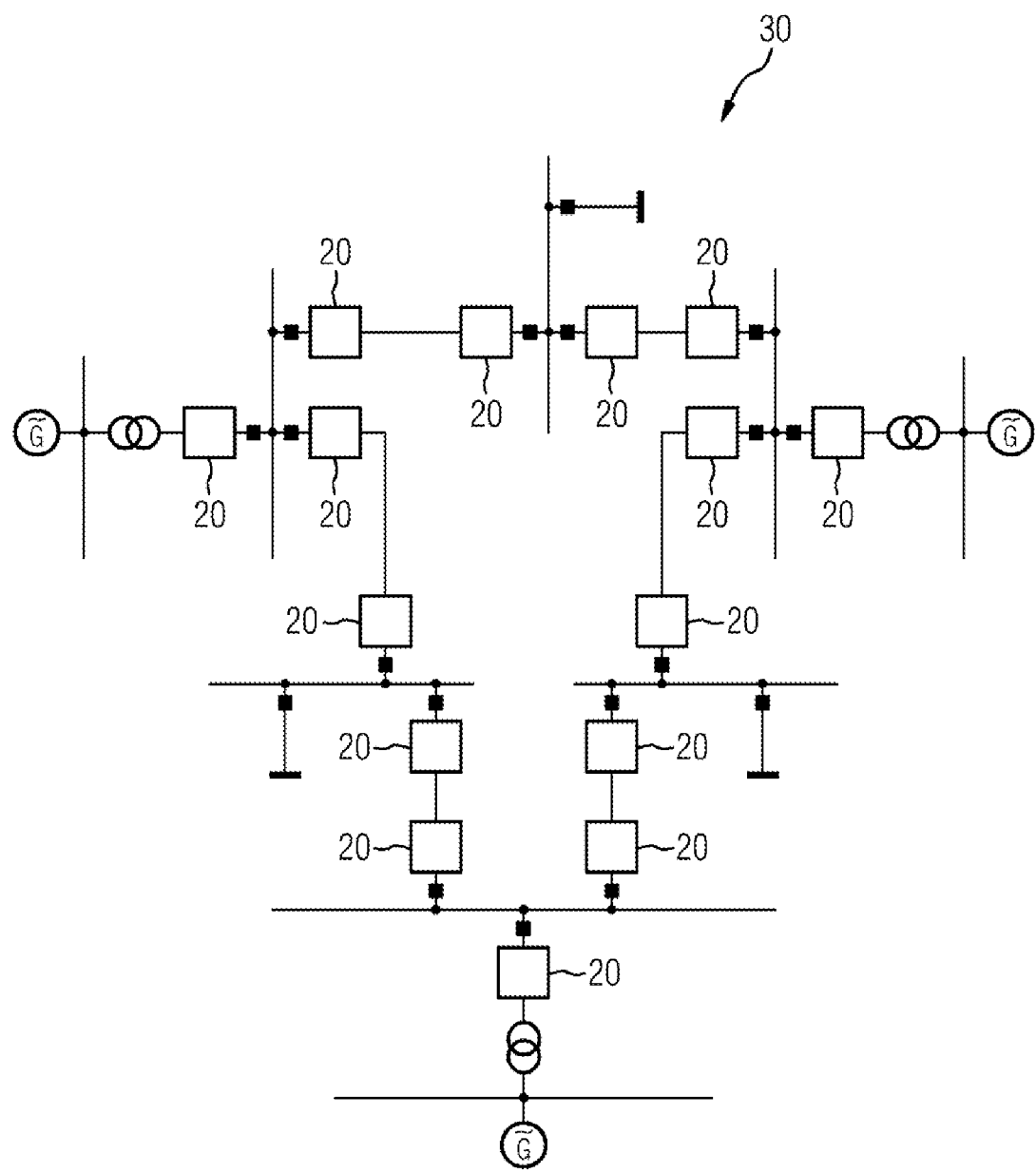
FIG. 3 shows a schematic representation of an energy distribution grid.

FIG. 3 shows the equivalent circuit diagram of an energy supply grid 30 in the form of an IEEE 9 bus system. This serves as an exemplary reference for the following description of a training approach for neural networks for the purpose of their use in electrical grid protection technology. In the reference grid, protection devices 20 are provided in the local vicinity of respective measuring points, each of which has, instead of deterministic protection logic, a trained neural network which is stored locally in the protection device 20a-o. Although the protection devices 20 are trained to independently carry out all protection functions without having to rely on communication with other protection devices, they can use the optional communication interface 23 (cf. FIG. 2) to have a temporary possible way of communicating with a higher-level entity that can adjust the edge weights of the neural networks. This only serves to allow the respective neural networks to be adapted to the current situation when there are changes in the topology of the electrical energy supply grid. The classification of the current operating state of the energy supply grid and any tripping decision associated with this in the event of a fault for each protection device 20 is made without using a communication connection and is the sole responsibility of the locally stored neural network which was previously adapted to the individual conditions of the respective installation location of the protection devices 20 in a training process.

For the implementation of the approach described below, the presence of a detailed simulation model of the corresponding energy supply grid to be monitored, in which the protection devices 20 are used, is useful. In addition, it is possible to use a so-called "Protection Security Assessment System" (PSA system) which enables the automated evaluation of protection-related tripping decisions.

Figure 4:
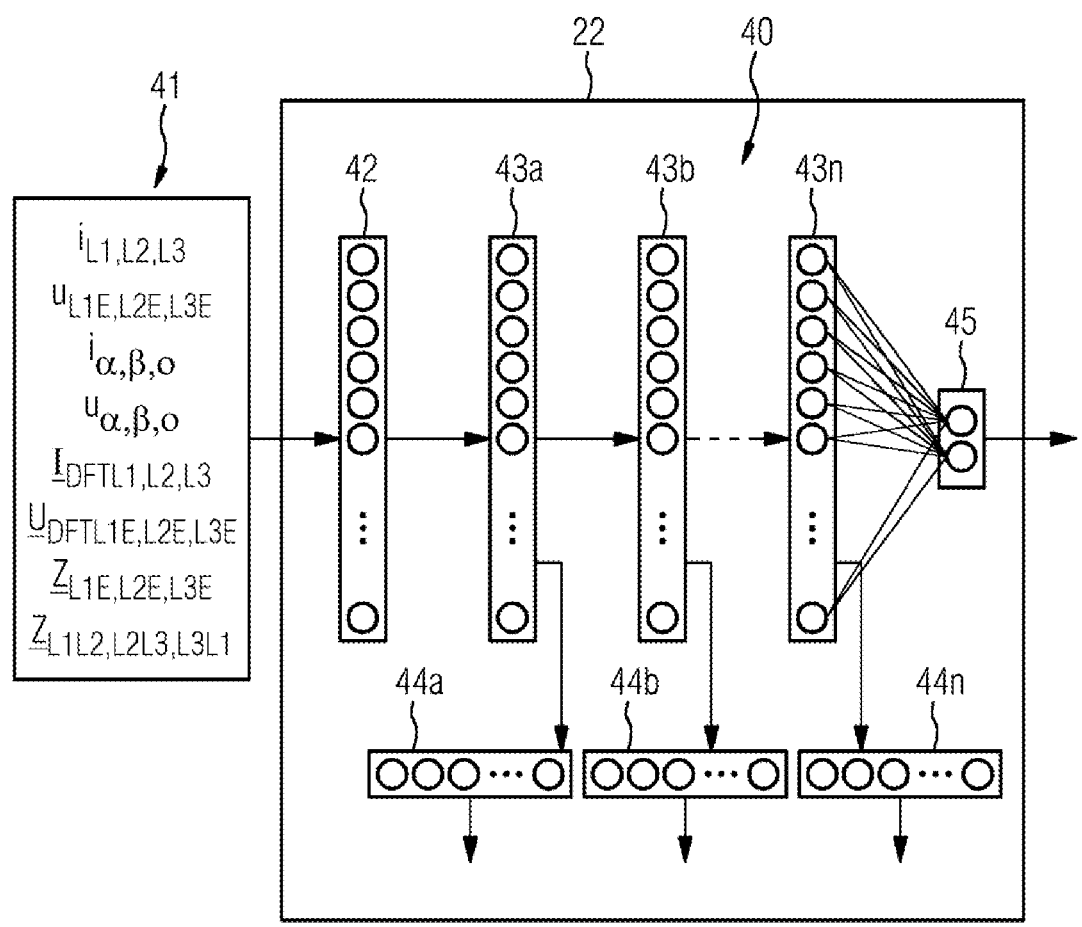
FIG. 4 shows a detailed representation of an exemplary embodiment of an evaluation device of a protection device.

FIG. 4 shows a simplified representation of the evaluation device 22 used in the protection devices 20 and the structure of the neural network 40 used. The measured values provided by the measured value acquisition device 21 (cf. FIG. 2) are fed to the input side of the neural network 40 in the form of an input vector 41. In this case, the input vector contains measured values of directly measured electrical variables and of electrical variables derived therefrom, on the basis of which the tripping decision can be made. Such electrical variables can be, for example, the following, although the list is not to be considered exhaustive:

currents of the individual phases $i_{L1}$, $i_{L2}$, $i_{L3}$;
voltages of the individual phases to ground L1E, $u_{L2E}$, $u_{L3E}$;
α, β and 0 components of a transformation (e.g. Clarke transformation) of the currents and voltages;
components of the currents and voltages determined by means of a transformation into the frequency domain (e.g. Discrete Fourier Transformation DFT);
impedances Z of the individual conductor-to-conductor and conductor-to-ground loops.

This input vector 41 is assigned to the neurons of the input neuron layer 42 of the neural network 40. The further branched connections of the neural network 40 comprise a plurality of intermediate neuron layers 43a-n and extend to the layer 43n. An intermediate output neuron layer 44a-n for outputting intermediate results of individual protection functions is connected to at least one of the intermediate neuron layers 43a-n. For example, a first intermediate output neuron layer 44a for outputting an intermediate result regarding an event classification, a second intermediate output neuron layer 44b for outputting an intermediate result regarding a fault type and a further intermediate output neuron layer 44n for outputting an intermediate result regarding the determination of a fault location may be provided. Thus, the intermediate output neuron layers 44a-n can provide aggregated intermediate results that contain specific statements regarding the event classification (e.g. short circuit, inrush, load, osciliation), the fault type (e.g. 3-pole, 2-pole, single-pole) and the detected fault location. Further intermediate output neuron layers for intermediate results regarding additional protection functions can also be provided. A major advantage of integrating these additional intermediate output neuron layers 44a-n lies in the increase in the decision transparency of the neural network.

Finally, the last intermediate neuron layer 43n is connected to an output neuron layer 45 which outputs a complete classification of the current operating state of the energy supply grid.

As mentioned, a two-stage training process is provided for a protection device 20 used in a decentralized manner. Within a first section comprising the input neuron layer 42 and the intermediate neuron layers 43a-n, the edge weights of the neural network are adapted according to the first training stage. Here, pre-training is carried out on the basis of a deep learning approach, preferably with backpropagation, in which the edge weights of this first section are adapted, e.g. using a simulated training data set.

In the course of the first training stage, all combinations of operating scenarios and events are therefore first of all simulated and automatically labeled using the grid model. The labeling, i.e. the pre-classification of the individual scenarios, here indicates the type of event, the type of short circuit and the location of the short circuit.

Figure 5:
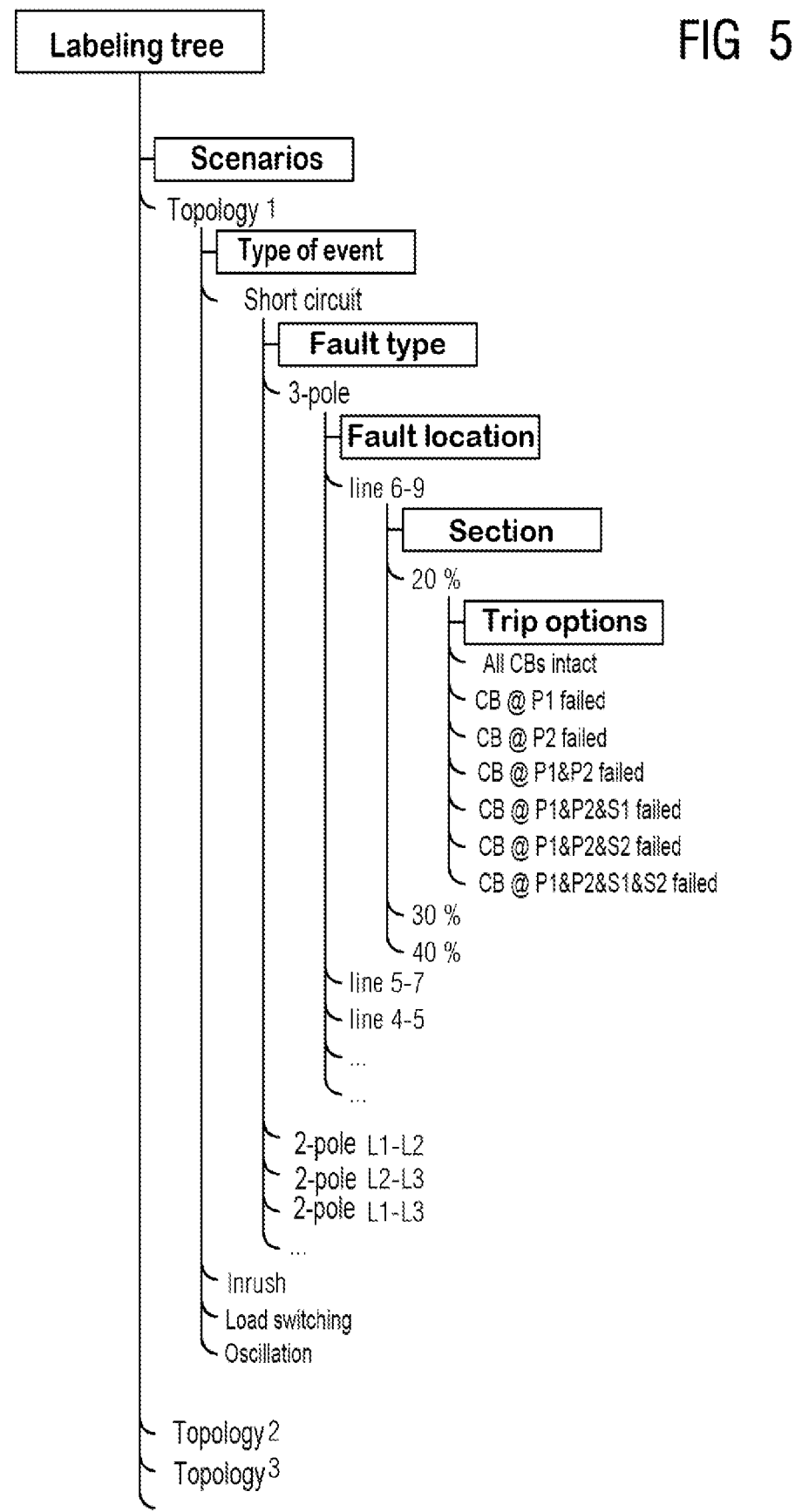
FIG. 5 shows a tree structure for explaining the protection functions carried out by the evaluation device from FIG. 4.

An exemplary classification tree ("labeling tree") is shown in FIG. 5 and shows the structure of an exemplary embodiment of the labels used. The scenarios that reflect a combination of the topology and the current operating situation of the electrical energy supply grid can be found here at the top level. A distinction is made below between the event classes, each of which has an individual substructure. Only the structure of the short-circuit class is shown here. This is divided into the fault type, the fault location (equipment), the section and the respective trip options. These trip options represent different variants with regard to the potential tripping behavior of the protection devices. CB stands for circuit breaker here, while P and S indicate the installation locations of the primary and secondary protection. These failure variants of the individual circuit breakers are useful in order to make it possible for the neural network to train the secondary and tertiary backup protection behavior.

After completion of the pre-training in the first training stage, the determined edge weights of the relevant connections are therefore "frozen" and are no longer changed in the subsequent, second training stage. This is because the principle of the deep learning approach with backpropagation cannot be continued to the final output neuron layer 45 when the protection devices are used in a decentralized manner, since the behavior of a protection device in interaction with other protection devices can only be trained using deep learning with a disproportionately large amount of effort. Since each protection device should specifically have its own decision-making entity locally in the device without the need to communicate with other protection devices, the best possible model solution for the individual protection device, from which the labeling could be derived for this case, depends on the behavior of the other protection devices.

Theoretically, it would indeed be possible to simulate all of these conceivable cases of external trip sequences in the vicinity of the protection device to be trained. However, setting up these cases and the corresponding labeling would be more complex than calculating the configuration of deterministic protection logic (e.g. distance protection) for some reference scenarios, which is why this way appears to be impractical. This means that a second training stage is required for decentralized use.

The edge weights of the connections between the intermediate neuron layer 43n and the final output neuron layer 45 are defined and optimized in the second training stage by using a reinforcement learning approach.

First, a plurality of copies of each neural network, which has undergone the pre-training for a corresponding protection device installation location according to the first training stage, are generated in this case and an initial allocation of their edge weighting between the last intermediate neuron layer 43n and the final output neuron layer 45 is determined at random. These copies are then subjected to an evolutionary selection process, for example. For this purpose, the simulation model of the network section already used in the first training stage is used again. This time, however, no previously simulated training data set is used; instead, the neural networks, which each represent a protection device, can now perceive the simulation directly as an environment and interact with it by influencing it with their tripping decision.

For this purpose, simulations containing a short circuit or another event are first carried out and recorded. The recorded magnitudes of the input vector are played to the protection devices represented by the pre-trained neural networks, taking into account their respective installation location, and their tripping decision is logged in an event list. The recorded simulation data are therefore only correct up to the time stamp of the first trip command, since this intervention would usually result in a topology change. Therefore, the simulation is repeated with the inclusion of the first issued trip command and the results are played again to the neural networks representing the protection devices. However, the protection device that issued this first trip command may not participate again in this round. This loop is repeated until the simulation has been played without adding new trip commands or until all protection devices have tripped. Each protection device is then individually assessed, e.g. by a PSA system. Bonuses are awarded in this case for rapid tripping after a fault has occurred. A protection device receives penalties for tripping decisions that violate certain rules. The individual assessments are then summed up to form an overall score.

The entire process is then repeated with new neural networks of the protection devices until an overall result is available for all groups (formed from the interaction of in each case one neural network copy of all installation locations). The groups are then ranked in descending order of their overall score, with the top 10% surviving and the other 90% being eliminated. This is followed by the generation of new copies in order to increase the population of the neural networks back to the original value. The newly added offspring correspond in this case to the copies of the group from which they emerge, but have random variations in their edge weights between the last intermediate neuron layer 43n and the final output neuron layer 45. Those neural networks of the protection devices that contributed the lowest individual score to the overall score of the group within the respective group experience a greater change in their edge weights. The process then begins again and is ended only when there are no longer any significant improvements in the overall score of the best group.

After this second training process, the neural networks are trained, taking into account the respective installation location, in such a way that they can make independent decisions on the classification of the operating state during operation of the energy supply grid.

With a central protection concept, the second training stage is omitted. Assuming that, instead of a decentralized decision-making structure, use is made of a singular centralized protection device based on a single neural network, which receives all measured input variables from all protection device installation locations and controls all circuit breakers in the grid area with its output layer, it is specifically possible to continue with the principle of deep learning with backpropagation to the final output neuron layer, since the automated labeling of the simulation data can be derived from a single simple model solution. For each variant of the lowest hierarchical level of the classification tree in the substructure of the short-circuit events (cf. FIG. 5), the centralized protection device should send trip commands to the corresponding circuit breakers in sequence starting from the predicted short-circuit location in all topological directions when a short circuit is detected. If, for example, the opening of a circuit breaker at the primary protection location does not succeed, the circuit breakers further away from the short circuit at the secondary protection locations are addressed. For the example in FIG. 5, based on a centralized protection device according to this principle, a model solution for the elements of the lowest hierarchical level (CB behavior) could be defined as a training label.

Figure 6:
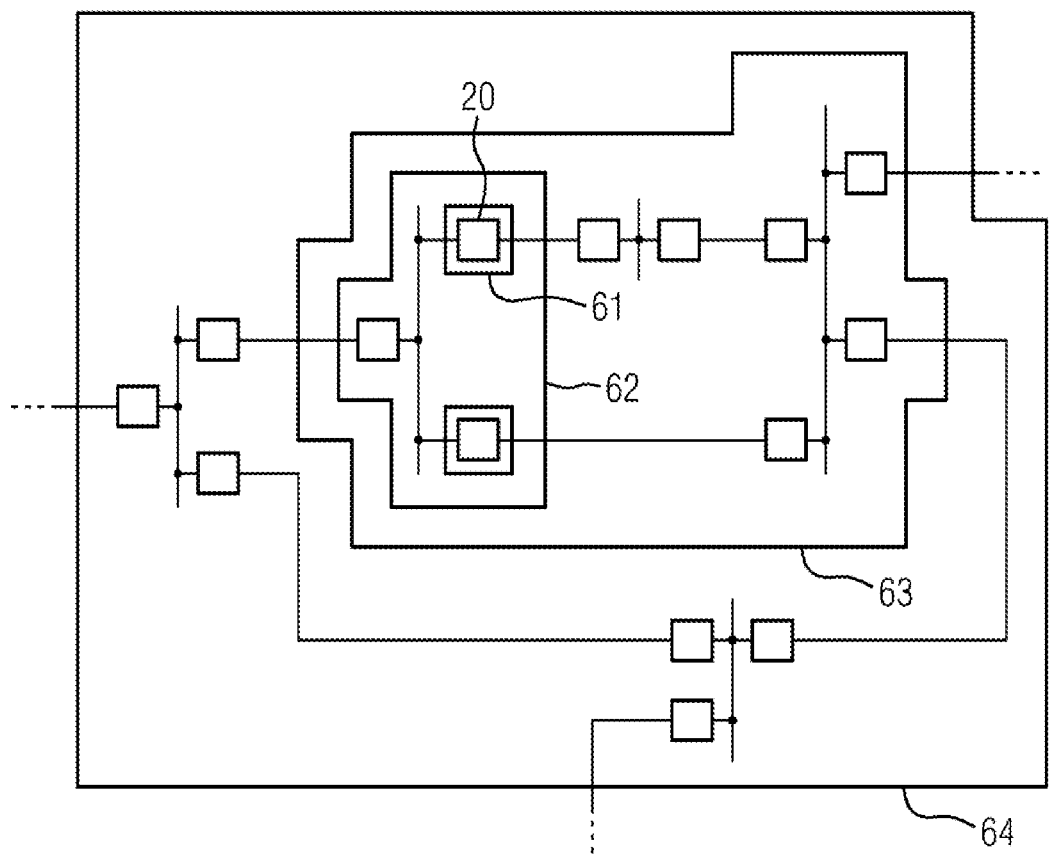
FIG. 6 shows different gradations between a centralized and a decentralized protection architecture.

As already mentioned, the proposed solution is characterized by high scalability between a decentralized and a centralized protection approach. A protection architecture in which the protection device installation locations known from currently conventional practice (typically the individual busbar outgoing circuits of the grid stations) were taken as a basis as the application level of autonomously acting neural networks is referred to as a decentralized approach. However, the solution approach described is not limited to this embodiment, but can be scaled with regard to the application level. This is to be illustrated using an example in FIG. 6. An exemplary electrical energy supply grid is shown here. Since the simulation model of the energy supply grid plays an essential role both in the first training phase and in the second training phase, the limits of the simulation model with regard to the scaling of the described solution approach define the theoretical upper limit of the application level. The application level of the completely decentralized approach is indicated in FIG. 6 with the reference sign 61. If the application level is increased to station level (reference sign 62), this affects three outgoing circuits in the example shown. In contrast to the completely decentralized approach, instead of three autonomous trained neural networks, only one neural network that has been trained accordingly in a different way is now used. The measured values from all three outgoing circuits are now available to said neural network in the input vector and the final output neuron layer now has four output neurons (no tripping, tripping of circuit breaker outgoing circuit1, . . . outgoing circuit2, . . . outgoing circuit3). This scaling consideration can also be extended beyond the station level, as a result of which entire grid regions (reference sign 63) are combined to form an autonomously acting neural network according to this principle. As already mentioned, the theoretical upper limit of this extension is at the limits of the simulation model. This embodiment of the solution approach is referred to as a centralized approach (reference sign 64).

On closer inspection, it can be concluded that the step-by-step increase in the application level from the decentralized approach toward the centralized approach reduces the training effort further and further in the second training phase (reinforcement learning) until reinforcement learning can be omitted once the centralized approach has been reached, since there is a singular decision-making entity here which makes it easy to also automate the training data labeling with regard to the final output neuron layer. At the same time, however, the communication dependency of the method and the distances over which information must be exchanged increase with the increase in the application level. In this respect, although the decentralized approach has the highest training effort in the second training stage, it constitutes a reliable fallback solution because its tripping decision does not require a communication connection.

Figure 7:
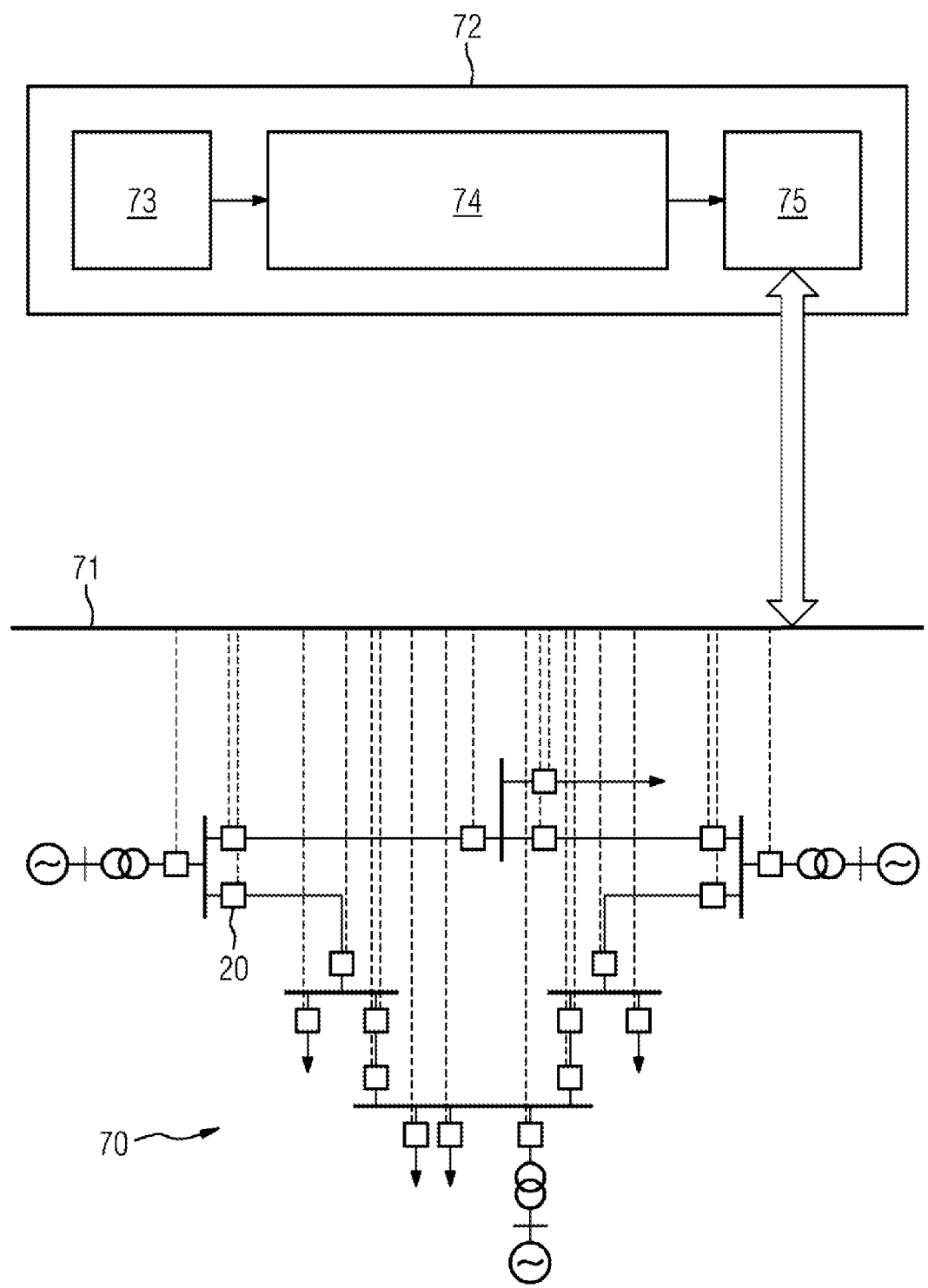
FIG. 7 shows a schematic representation of a decentralized protection architecture.

A decentralized protection architecture is shown schematically in FIG. 7. An energy supply grid 70 shown as an example comprises a multiplicity of protection devices 20 which are indicated as small rectangles in FIG. 7. The protection devices are arranged in the local vicinity of measuring points in the energy supply grid and are connected to measuring sensors for recording measured values in a manner that is not shown. In addition, they are operatively connected to switching devices in the energy supply grid in order to cause them to interrupt the current flow in the event of a fault.

Each of the protection devices 20 is designed as described in connection with FIGS. 2 and 4 and includes, in particular, an evaluation device that is designed in the form of a specially trained neural network. As described above, a two-stage training approach was used for this purpose in the decentralized protection architecture present here. As a result, each protection device 20 is able to carry out all the necessary protection functions independently and to make a decision as to whether the energy supply grid 70 is in a permissible or impermissible operating state. In the event of an impermissible operating state, a complete fault classification can take place with the neural network. In addition, the neural network can react to decisions made by other protection devices 20 without being communicatively connected to them for this purpose.

The protection devices 20 only have a communication connection to a station bus 71 in order to be able to temporarily exchange data with a higher-level control center 72. During the rest of operation, each of the protection devices operates completely independently.

The higher-level control center 72 can be designed, for example, as a dedicated grid control center with one or more data processing devices for monitoring and controlling the energy supply grid 70. Alternatively, the control center 72 can also be formed in a cloud computing system, such as Siemens Mindsphere®, and make its functions available as a cloud service.

In addition to its monitoring and control functions, the control center 72 is also used to train the neural networks of the protection devices 20. For this purpose, the control center 72 has a simulation unit 73 which simulates the behavior of the energy supply grid 72 in all possible operating scenarios and automatically labels the results. For example, the simulation unit 73 can include a so-called "digital twin" of the energy supply grid 70 for this purpose. The simulation unit 73 outputs labeled training data for the process of training the neural networks of the protection devices 20 on the output side.

The training data are fed to a training unit 74 in which the two-stage training process described in detail above is carried out. On the output side, the training unit 74 outputs parameters in the form of edge weights for the neural networks of the protection devices 20, the installation location of the respective protection device 20 being taken into account when generating the edge weights.

The edge weights are forwarded to a communication unit 75 which is connected to the station bus 71 and thus to the protection devices 20. The communication device 75 transmits the edge weights to the protection devices 20 which use them to configure their neural networks.

If necessary, the edge weights can be adjusted during operation of the energy supply grid in order to adapt the protection devices to new conditions such as changed network topologies.

Furthermore, the protection devices 20 transmit operating data of the energy supply grid 70 to the control center 72, which data include, for example, grid and switching states as well as fault records recorded in the event of a fault.

Figure 8:
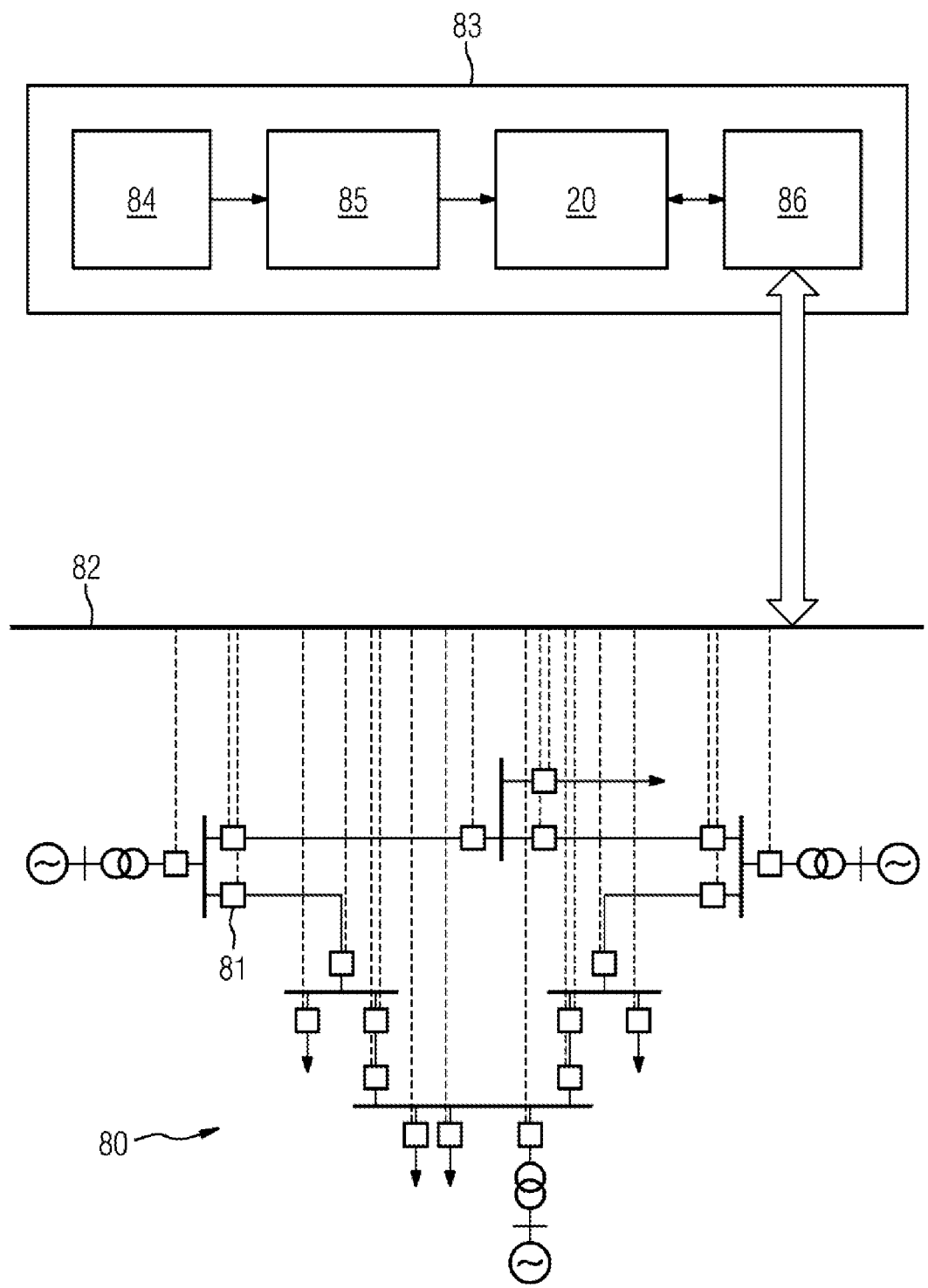
FIG. 8 shows a schematic representation of a centralized protection architecture.

Finally, FIG. 8 shows an exemplary embodiment of a centralized protection architecture. In contrast to the energy supply grid 70 in FIG. 7, the energy supply grid 80 shown in FIG. 8 no longer has any protection devices 20. Instead, measuring devices 81, e.g. so-called merging units, which are used to combine measured values from different converters, are provided and transmit measured values recorded at the measuring points to a process bus 82. In addition, the energy supply grid 80 has actuator devices for controlling switching devices. These can be integrated into the measuring devices 81 or be designed as separate devices. The energy supply grid 80 thus does not include any decentralized intelligence for detecting impermissible operating states.

The process bus 82 is connected to a control center 83 which, like the control center 72 in FIG. 7, can be designed as a dedicated control center or can be formed in a cloud computing system and has a simulation unit 84 which is likewise used to simulate all possible operating scenarios of the energy supply grid 80 and to generate labeled training data.

The labeled training data are fed to a training unit 85 which performs the one-stage training process described above and outputs edge weights. The edge weights are fed to a centralized protection device 20 formed in the control center 83, where they are used to configure the neural network. In contrast to the situation in FIG. 7, the neural network of the protection device 20 in FIG. 8 is trained to make a decision about the operating state for the complete energy supply grid 80 and, if necessary, to carry out a fault classification. For this purpose, the protection device 20 in FIG. 8 uses the measured values which were recorded at all measuring points and are made available to it, for example, as a continuous stream via the process bus and a communication unit 86. If the protection device 20 detects a fault, it sends a trip signal via the communication unit 86 to the relevant actuator device in the energy supply grid 80 in order to interrupt the fault current by opening one or more switching devices.

A new protection device 20 comprising a neural network with which it processes all protection functions together has thus been described above. The protection device 20 can be used in decentralized and centralized protection architectures, with its training process being adapted to the respective architecture. In summary, the described protection device 20 has the following advantages, among others:

The protection device is a self-learning system that constantly adapts to the changing grid.
The protection device is characterized by high selectivity and fast tripping times.
The protection device is independent of device hardware.
The protection device can be used for any topology of the energy supply grid at any level (field level, station level, control center level).

Although the invention has been illustrated and described in more detail above by preferred exemplary embodiments, the invention is not restricted by the disclosed examples and other variations may be derived therefrom by a person skilled in the art without departing from the scope of protection of the following patent claims.

The invention claimed is:

1. A protection device for monitoring an electrical energy supply grid, the protection device comprising:
   a measured value acquisition device for acquiring measured values which have been recorded at at least one measuring point in the energy supply grid and which indicate an electrical state of the energy supply grid at the at least one measuring point; and
   an evaluation device connected to said measured value acquisition device and being formed entirely as a single neural network having an input neuron layer, at least one intermediate neuron layer, and an output neuron layer;
   said evaluation device being configured to carry out a plurality of protection functions on a basis of the measured values and, as a result of the protection functions being carried out, to make a decision as to whether the energy supply grid is in a permissible or impermissible operating state; and
   said input neuron layer being configured to receive the measured values and/or values derived therefrom, said output neuron layer being configured to output a classification of operating states of the energy supply grid, and said neural network, for classifying the operating states, being trained to carry out all the protection functions together; and
   wherein at least one of said intermediate neuron layers is connected to an intermediate output neuron layer, and wherein each intermediate output neuron layer is configured to output a result specific to a single protection function.

2. The protection device according to claim 1, wherein the protection functions include at least a classification of an event, a detection of a fault type, and a determination of a fault location.

3. The protection device according to claim 1, wherein:
   the protection device is configured for local operation at an installation location in a vicinity of the at least one measuring point and has a command device for outputting control commands to switching devices of the energy supply grid; and
   said neural network is trained to classify the operating states of the energy supply grid in a two-stage learning method.

4. The protection device according to claim 3, wherein the protection device is specifically trained for use at the respective installation location.

5. The protection device according to claim 3, further comprising a communication interface for connection to a higher-level control center and for receiving parameters for calibrating said neural network.

6. The protection device according to claim 3, wherein said neural network is trained in a first stage with a deep learning method and is trained in in a second stage with a reinforcement learning method.

7. A protection device for monitoring an electrical energy supply grid, the protection device comprising:
- a measured value acquisition device for acquiring measured values which have been recorded at at least one measuring point in the energy supply grid and which indicate an electrical state of the energy supply grid at the at least one measuring point; and
- an evaluation device connected to said measured value acquisition device and being formed entirely as a single neural network having an input neuron layer, at least one intermediate neuron layer, and an output neuron layer;
- said evaluation device being configured to carry out a plurality of protection functions on a basis of the measured values and, as a result of the protection functions being carried out, to make a decision as to whether the energy supply grid is in a permissible or impermissible operating state; and
- said input neuron layer being configured to receive the measured values and/or values derived therefrom, said output neuron layer being configured to output a classification of operating states of the energy supply grid, and said neural network, for classifying the operating states, being trained to carry out all the protection functions together;
- wherein the protection device is a central protection device configured to receive measured values from sensors at a plurality of measuring points in the energy supply grid and to control switching devices at a plurality of points in the energy supply grid; and
- said neural network is trained to classify operating states of the energy supply grid using a one-stage learning method, and said neural network is trained using a deep learning method.

8. A method for monitoring an electrical energy supply grid, the method comprising:
- acquiring measured values at one or more measuring points in the energy supply grid, the measured values indicating an electrical state of the energy supply grid at the one or more measuring points;
- providing a protection device with an evaluation device being designed entirely in the form of a single neural network having an input neuron layer, at least one intermediate neuron layer, and an output neuron layer;
- transmitting the measured values to the protection device and receiving the measured values and/or values derived therefrom by the input neuron layer;
- carrying out a plurality of protection functions on a basis of the measured values by an evaluation device of the protection device and outputting with the output neuron layer a classification of operating states of the energy supply grid; and
- as a result of the protection functions being carried out, making a decision as to whether the energy supply grid is in a permissible operating state or in an impermissible operating state; and
- wherein at least one of the intermediate neuron layers is connected to an intermediate output neuron layer and outputting with the intermediate output neuron layer a result specific to a single protection function.

9. The method according to claim 8, which comprises, before starting the monitoring of the energy supply grid, training the neural network for classifying the operating states to carry out all protection functions together.

10. The method according to claim 8, wherein the protection device is a centralized protection device configured to receive measured values from sensors at a plurality of measuring points in the energy supply grid and to control switching devices at a plurality of points in the energy supply grid, and the method comprising training the neural network to classify the operating states of the energy supply grid using a one-stage learning method before starting the monitoring.

11. A method for monitoring an electrical energy supply grid, the method comprising:
- acquiring measured values at one or more measuring points in the energy supply grid, the measured values indicating an electrical state of the energy supply grid at the one or more measuring points;
- providing a protection device with an evaluation device being designed entirely in the form of a single neural network having an input neuron layer, at least one intermediate neuron layer, and an output neuron layer;
- transmitting the measured values to the protection device and receiving the measured values and/or values derived therefrom by the input neuron layer;
- carrying out a plurality of protection functions on a basis of the measured values by an evaluation device of the protection device and outputting with the output neuron layer a classification of operating states of the energy supply grid; and
- as a result of the protection functions being carried out, making a decision as to whether the energy supply grid is in a permissible operating state or in an impermissible operating state,
- wherein the protection device is configured for local operation at an installation location in a vicinity of the measuring point, and the neural network is trained to classify the operating states of the energy supply grid in a two-stage learning method before starting the monitoring; and
- in a first stage of the learning method, training a structure of the neural network from the input neuron layer to an intermediate neuron layer immediately upstream of the output neuron layer using a deep learning method; and
- in a second stage of the learning method, training a structure of the neural network from the intermediate neuron layer immediately upstream of the output neuron layer to the output neuron layer using a reinforcement learning method.

* * * * *